(12) United States Patent
Booker et al.

(10) Patent No.: US 6,932,200 B2
(45) Date of Patent: Aug. 23, 2005

(54) SHOCK ABSORBER AND MOUNTING SYSTEM FOR A DRAWER SLIDE

(75) Inventors: Todd Booker, Garner, NC (US); Georg Domenig, Kernersville, NC (US)

(73) Assignee: Grass America Inc., Kernersville, NC (US)

( * ) Notice: Subject to any disclaimer, the term of this patent is extended or adjusted under 35 U.S.C. 154(b) by 0 days.

(21) Appl. No.: 10/844,887

(22) Filed: May 13, 2004

(65) Prior Publication Data

US 2004/0227280 A1 Nov. 18, 2004

Related U.S. Application Data

(60) Provisional application No. 60/470,131, filed on May 13, 2003.

(51) Int. Cl.[7] .............................................. A47B 88/00
(52) U.S. Cl. .................. 188/300; 312/334.1; 312/319.1
(58) Field of Search ................................. 188/300, 301, 188/312; 267/64.12, 120, 226, 34, 124; 16/66–71, 82–85; 312/319.1–334.1

(56) References Cited

U.S. PATENT DOCUMENTS

| | | | |
|---|---|---|---|
| 4,040,144 A | | 8/1977 | Lasier et al. |
| 4,790,580 A | * | 12/1988 | Casilio ..................... 292/262 |
| 5,169,131 A | | 12/1992 | Shimura |
| 5,201,512 A | | 4/1993 | Rabin |
| 5,477,589 A | | 12/1995 | Lan |
| 6,167,589 B1 | * | 1/2001 | Luedtke .......................... 16/71 |
| 6,553,617 B1 | * | 4/2003 | Salice ............................ 16/85 |
| 6,615,450 B2 | | 9/2003 | Salice |
| 6,752,478 B1 | * | 6/2004 | Francz ....................... 312/334.1 |
| 6,799,663 B2 | * | 10/2004 | Dubach ................... 188/322.22 |
| 2002/0066629 A1 | | 6/2002 | Muller |
| 2003/0089565 A1 | | 5/2003 | Salice |
| 2003/0213683 A1 | | 11/2003 | Salice |

OTHER PUBLICATIONS

International Search Report mailed Mar. 28, 2005 corresponding to PCT/US 04/15276.

* cited by examiner

*Primary Examiner*—Chris Schwartz
(74) *Attorney, Agent, or Firm*—John M. Harrington; Kilpatrick Stockton LLP

(57) ABSTRACT

A shock absorber mounting system for a drawer slide system comprising a fixed drawer slide member fixedly attached to a furniture frame, a moveable drawer slide fixedly attached to a drawer and slideably attached to the fixed slide member for guiding the drawer in and out of a furniture frame, a shock absorber comprising a cylinder and a piston wherein the piston is operable to slide in and out of the cylinder and wherein air is controllably allowed to enter or escape the cylinder in response to movement of the piston, a retainer clip comprising a central aperture for receiving and retaining the shock absorber and a base portion comprising means for engaging a mounting bracket, and a mounting bracket comprising means for retaining the retainer clip and shock absorber and wherein the mounting bracket is fixedly attached to the fixed drawer slide. In another embodiment of the present invention, the moveable drawer slide comprises a piston engaging member for engaging the piston of the shock absorber, and the piston engaging member comprises a metallic flange and wherein the end of the piston further comprises a magnet.

7 Claims, 2 Drawing Sheets

SHOCK ABSORBER AND MOUNTING SYSTEM FOR A DRAWER SLIDE

CROSS REFERENCE TO RELATED APPLICATIONS

The present application claims priority under 35 U.S.C. § 119(e) from U.S. Provisional Patent Application Ser. No. 60/470,131, filed May 13, 2003, the disclosure of which is incorporated herein by reference.

FIELD OF THE INVENTION

The present invention relates to a shock absorber and mounting system for a drawer, and more particularly to a pneumatic shock absorber for receiving and attenuating the impact of a rapidly closing drawer and a system for mounting the shock absorber to a traditional drawer slide system design.

BACKGROUND OF THE INVENTION

There have been several attempts to provide damping devices or shock absorbers for moveable furniture members, particularly drawers. Early attempts include providing rubber or foam bumpers on the rear portion of the drawer or rear wall of the furniture frame. These solutions provide a relatively static bumper, which absorbs some of the force of impact, but fails when the drawer and/or its contents are heavy or traveling at a high rate of speed.

Pneumatic or hydraulic shock absorbers involving the use of pistons and a compressible or non-compressible fluid moving between two chambers are now being employed. For example, U.S. patent application Publication No. 2003/0213663 relates to a damping apparatus for moving furniture parts such as a drawer. The damping apparatus comprises at least two damping stages, each having a cylinder having a piston longitudinally displaceable therein which exert a damping action of different strengths.

U.S. patent application Ser. No. 10/743,359, which is based on German Patent No. 102 61 591.8, relates to a damping device for damping the kinetic energy of movable cabinet components, which has a first damping element with a first cylinder that has a first piston, which slides lengthwise in it, and at least one more (second) damping element with a second cylinder that has a second piston, which slides lengthwise in it. Both damping elements are located one behind the other in a serial arrangement and form an integral system. The invention is characterized by the fact that each of the two damping elements are each designed as pneumatic (air) dampers, and a compression chamber and an expansion chamber respectively contain variable volumes; whereby, the damping effects of the damping elements are affected by the guide canals, which control the air distribution and air flow within and between the compression chambers and/or expansion chambers.

While there are many shock absorber variations, the cylindrical nature of the shock absorber and forces exerted upon it during operation present particular difficulties when affixing the shock absorber to a drawer or drawer slide. None of the prior art references address the need for a shock absorber for a drawer slide which is easily mountable and incorporated into a standard drawer slide configuration.

In another prior art example, U.S. Pat. No. 5,201,521, a pneumatic shock absorber is incorporated into the front face of a drawer to assist in the alignment and prevent dishevelment of the contacts of the drawer which can occur during rapid closing. While this arrangement may be suitable for some purposes, such as the feeder drawer for a copy machine or printer discussed in the '521 patent, most consumers require the drawer slides and related components to be hidden from view.

Therefore, there is a need for a shock absorber for a drawer and more particularly a mounting system for a shock absorber which can be easily incorporated into common drawer slide system designs without the need for significant redesigning of the drawer slide system.

Prior shock absorber devices have not combined advantages of a pneumatic shock absorber with a mounting device and system that overcome disadvantages of prior art mounting systems. In particular, prior shock absorber designs do not include the capability shock absorbing characteristics with a non-obtrusive mounting system.

Thus, there is a need to provide a shock absorber for a drawer slide system which includes a mounting system that is readily adaptable to existing drawer slide designs. Further, there is a need for a shock absorber and mounting system which can be assembled without the use of tools or adhesives. This would allow a user to provide shock absorbing capabilities to an existing drawer slide system without the need for extensive redesign of the drawer slides to furniture frame.

It is to these perceived needs that the present invention is directed.

SUMMARY OF THE INVENTION

In a first aspect of the present invention, a shock absorber mounting system for a drawer slide system is provided comprising a shock absorber comprising a cylinder and a piston wherein the piston is operable to slide in and out of the cylinder and wherein air is controllably allowed to enter or escape the cylinder in response to movement of the piston, a retainer clip comprising a central aperture for receiving and retaining the shock absorber and a base portion comprising means for engaging a mounting bracket, and a mounting bracket comprising means for retaining the retainer clip and shock absorber. The shock absorber further comprises a collar for engaging the face of the aperture on the retainer clip. Preferably, the shock absorber mounting system is fixedly attached to a drawer slide.

In an additional embodiment of the present invention, the means for engaging a mounting bracket comprises a groove formed in the base portion for receiving a portion of the mounting bracket therein. In a further embodiment of the present invention, the means for retaining the retainer clip and shock absorber comprises an aperture in the mounting bracket and at least one vertical extending portion extending from an edge of the mounting bracket.

In a further embodiment of the present invention, the piston further comprises means for extracting the piston from the cylinder, which preferably comprise a magnet positioned near the end of the piston, but may optionally comprise a spring within the cylinder.

In a second aspect of the present invention, a shock absorber mounting system for a drawer slide system is provided comprising a fixed drawer slide member fixedly attached to a furniture frame, a moveable drawer slide fixedly attached to a drawer and slideably attached to the fixed slide member for guiding the drawer in and out of a furniture frame, a shock absorber comprising a cylinder and a piston wherein the piston is operable to slide in and out of the cylinder and wherein air is controllably allowed to enter or escape the cylinder in response to movement of the piston, a retainer clip comprising a central aperture for receiving and retaining the shock absorber and a base portion comprising means for engaging a mounting bracket, and a mounting bracket comprising means for retaining the retainer clip and shock absorber and wherein the mounting bracket is fixedly attached to the fixed drawer slide. In another embodiment of the present invention, the moveable drawer slide comprises a piston engaging member for engaging the piston of the shock absorber, and the piston engaging member comprises a metallic flange and wherein the end of the piston further comprises a magnet.

In another aspect of the present invention, a shock absorber and mounting system is provided. The shock absorber comprises a body with a piston inserted thereto, a retainer clip and a mounting bracket. The piston is inserted into the body of the shock absorber and provides resistance by forcing the air in the body through a small opening and out of the shock absorber when the piston is depressed. The body of the shock absorber rests in a retainer clip which has a substantially flat body portion and two side portions extending therefrom and defining a partially rounded cavity. The body portion snaps into the partially rounded cavity and secures the shock absorber in the retainer clip.

The retainer clip comprises a groove in at least two sides, which allows the retainer clip to be held in place in the mounting bracket. The mounting bracket comprises a base with a cut out defining an aperture open on one end. Aperture provides means for receiving and holding the retainer clip. The retainer clip is slid into the aperture such that the sides of the aperture engage the grooves on the sides of the retainer clip.

Once the retainer clip is installed, the body of the shock absorber is clipped into the partially rounded cavity. The piston and cylinder extend in the direction of the drawer slide past at least the one vertically extending portion provided proximate to the aperture of the mounting bracket. This configuration locks the shock absorber and retainer clip in place. The mounting bracket and retainer clip are engaged to prevent movement in directions parallel to the long axis of the drawer slide, and the body of the shock absorber prevents movement perpendicular to the drawer slide by engaging the vertically extending portions of the mounting bracket if the shock absorber is moved in that direction.

In one embodiment of the present invention, the mounting bracket is slideably attached to the drawer side through wings on the mounting bracket and apertures in the drawer slide. The wings are allowed into a receiving aperture in the drawer slide and slid into retaining apertures to hold the mounting bracket securely in place. Conversely, the mounting bracket may have apertures for receiving wings, or protrusions on the drawer slide.

At the exterior tip of the piston is a magnet to detachably attach the piston to a plunger engagement member provided on the drawer or moveable drawer slide. When the drawer slide nears the end of its track, the piston engagement member contacts the piston and pushes the piston into the shock absorber cylinder. This action provides controlled resistance to slow the closing motion of the drawer slide. To assist in the closing of the drawer slide, a closing means, such as a spring, may be engaged to pull the drawer closed against the resistance of the shock absorber. When the drawer is opened, the magnet is attracted to and attaches to the metal protrusion on the drawer slide and the piston is pulled out of the body to its fully extended position. When the piston reaches this position, the metal protrusion is pulled away from the magnet as the drawer slide continues on its track.

Features of a shock absorber and mounting system for a drawer slide of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A shock absorber and mounting system of the present invention provides numerous advantages over prior drawer impact absorbing devices. For example, the present invention advantageously provides a pneumatic impact relief mechanism to slow and cushion a rapidly closing drawer, thereby preventing damage to the drawer, drawer slide system or contents of the drawer.

Another advantage is that the present invention provides a mounting system for mounting a pneumatic shock absorber to a drawer slide system without the need for extensive redesigning of the drawer slide system.

As will be realized by those of skill in the art, many different embodiments of a shock absorber and mounting system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
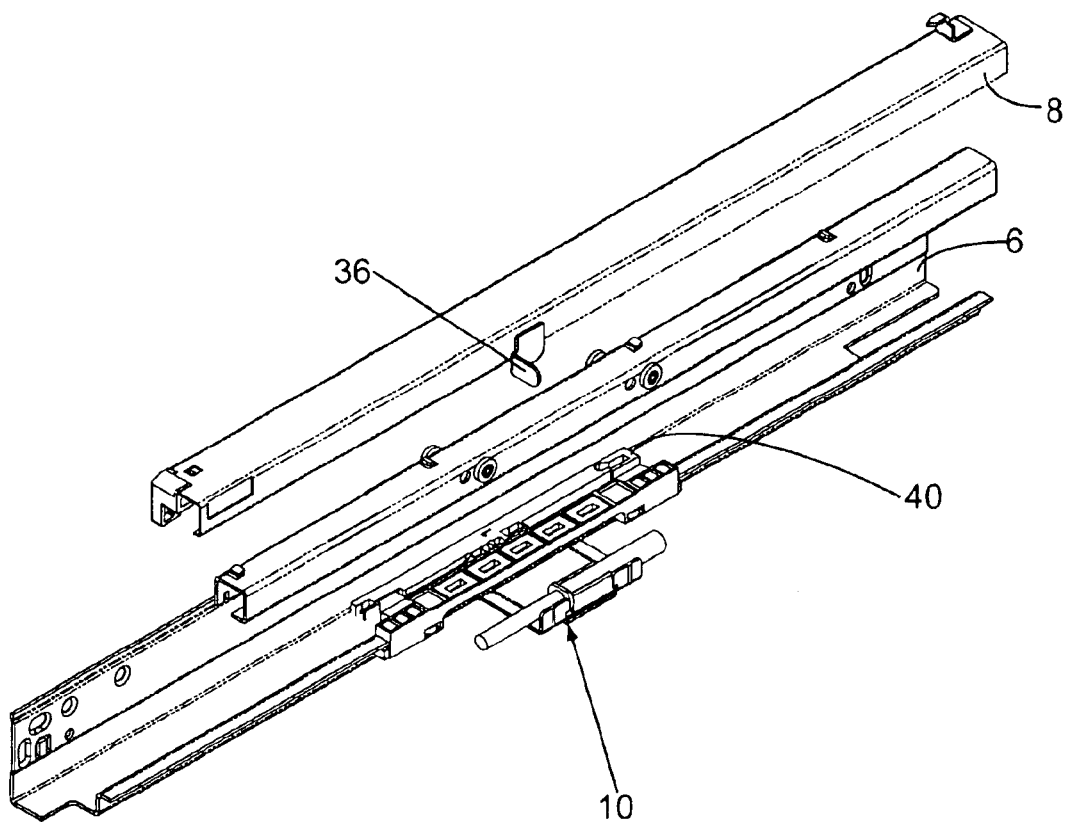
FIG. 1 is a perspective view of a shock absorber and mounting system incorporated into a drawer slide assembly in an embodiment of the present invention.
Figure 2:
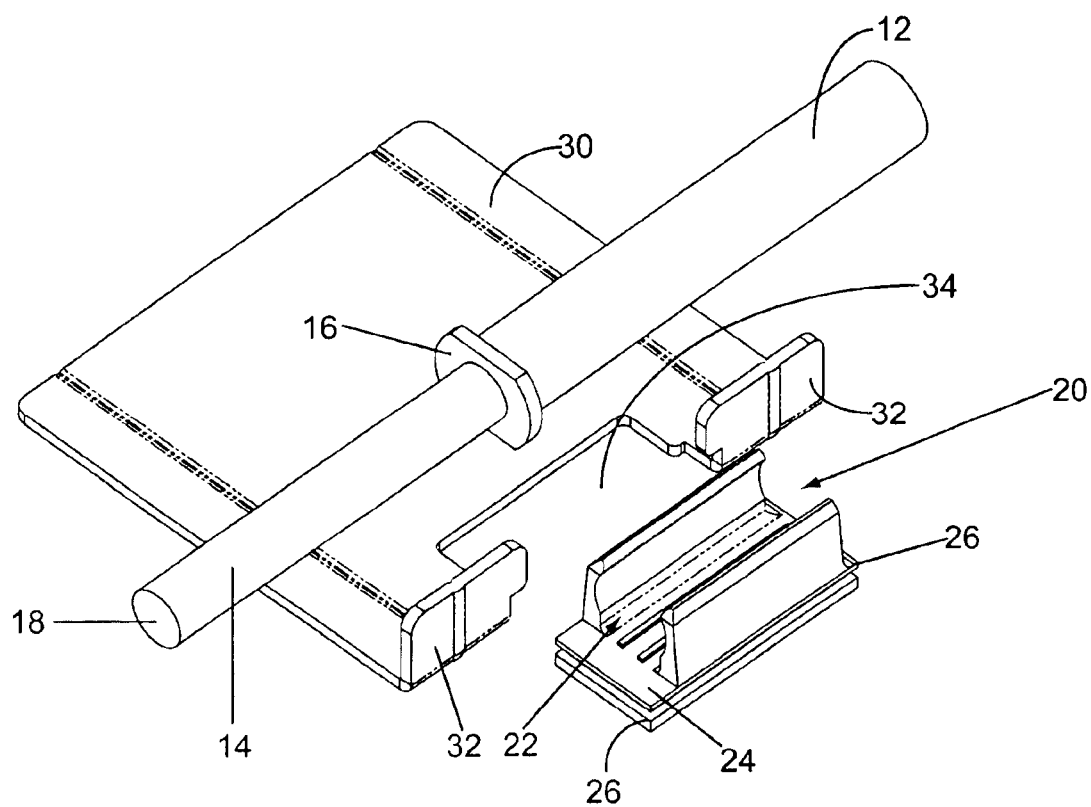
FIG. 2 is an exploded view of a shock absorber and mounting system in an embodiment of the present invention.

In a first aspect of the present invention, a shock absorber and mounting system for a drawer slide is provided comprising a shock absorber, a retention clip and a mounting bracket. Preferred embodiments of the shock absorber and mounting system are illustrated in FIGS. 1 and 2 and further described herein. The shock absorber and mounting system of the present invention advantageously provides for a mounting system which is assembled without the use of tools or adhesives.

In a preferred embodiment of the present invention, the shock absorber comprises a cylinder 12, a piston 14, and a collar 16. In a simplified design, as a mass collides with the end 18 of the piston 14, the piston 14 is moved into the hollow cylinder 12 compressing the fluid, preferably air, therein. The air inside the cylinder 12 is allowed to escape through pathways between the piston and the cylinder to provide a controlled airflow out of the cylinder. As the air leaves the cylinder, the piston continues to travel into the cylinder until substantially all the air is expelled and/or the piston is fully inserted into the cylinder. This controls the force of the object colliding with the piston and provides a slow deceleration of the mass.

The present invention is operable with many internal shock absorber designs including two-chamber designs or spring loaded designs. A preferred shock absorber design is that discussed in U.S. patent application Ser. No. 10/743, 359, herein incorporated by reference, which is based on German Patent No. 102 61 591.8, and assigned to Grass GmbH, of Austria, the parent company of the current assignee.

In one embodiment of the present invention, the shock absorber and mounting system is securely engaged to a fixed drawer slide 6. The fixed drawer slide 6 is mounted to a furniture frame member. A moveable drawer slide 8 is affixed to the drawer and engages and slides upon the fixed drawer slide 6, thereby providing a drawer slide system.

In a further embodiment of the present invention, the drawer, or moveable drawer slide 8 is provided with a piston engagement member 36 to provide a controlled collision surface for the piston 14. In a preferred embodiment of the present invention, the piston engagement member 36 comprises a flange extending from the moveable drawer slide 8. When the drawer is pushed into the furniture frame, the piston engagement member 36 collides with the end of the piston 18 and pushes the piston 14 into the cylinder 12.

In another embodiment of the present invention, the shock absorber further comprises means for extracting the piston 14 from a fully inserted position within the cylinder 12. The piston is compressed when the drawer is closed and a portion of the drawer or drawer slide abuts and engages the piston on the shock absorber. When the drawer is pulled out from a fully closed position, the piston must be likewise pulled out of the cylinder so as to ready the shock absorber for another closing collision and compression.

In one embodiment of the present invention, the means for extracting the piston from the cylinder comprise a spring means within the cylinder to push the piston back into an extended position once the drawer or drawer slide is pulled from the furniture frame. When the drawer is pulled out, the spring means is allowed to push the piston out of the cylinder, thereby allowing air to reenter the cylinder and ready the shock absorber for another drawer closing collision.

In a preferred embodiment of the present invention, the means for extracting the piston form the cylinder comprises a magnet on the end of the piston 18 which is attracted to the piston engagement member 36 on the moveable drawer slide 8. In this manner the end of the piston 18 is releaseably attracted and engageable to the piston engagement member 36. When the drawer is pulled from the furniture frame, the magnet at the end of the piston 18 will provide a force to keep the piston engaged with the piston engagement member 36 thereby pulling the piston from the cylinder. When the piston is fully extended, the piston engagement member 36 will continue to be pulled along with the drawer and drawer slide thereby overcoming the force from the magnet and disengaging the piston from the piston engagement member thereby leaving the piston in an extended and ready position.

The retainer clip 20 is provided to slideably retain the shock absorber and provide means for engaging the shock absorber to the mounting bracket 30. The retainer clip 20 comprises means for retaining the shock absorber and means for engaging the mounting bracket. Through this configuration the shock absorber is engaged to the mounting bracket without the use of tools, screws, or the like. In a preferred embodiment of the present invention, the retainer clip comprises a plastic based material.

In a preferred embodiment of the present invention, the means for retaining the shock absorber in the retainer clip comprises a central aperture 22 in the retainer clip 20. the central aperture is formed by opposing sides of the retainer clip which slightly curve along their interior facing walls to conform to the shape of the shock absorber cylinder. The shock absorber cylinder 12 is inserted in a slideable manner into the central aperture 22 up and to the point at which the collar 16 on the cylinder 12 abuts the end of the retention clip, thereby preventing further movement of the cylinder 12 through the central aperture 22.

In an additional embodiment of the present invention, the means for engaging the retainer clip 20 to the mounting bracket 30 comprises a groove 26 formed in the base 24 of the retainer clip. The groove 26 allows the retainer clip to be slideably mounted to an aperture 34 in the mounting bracket 30. The groove is dimensioned to be slightly larger than the thickness of the mounting bracket allowing a portion of the mounting bracket 30 to slide into and engage the groove, thereby securing the retainer clip 20.

In one embodiment of the present invention, the groove 26 extends completely around the base 24 of the retainer clip 20. In this manner, the retainer clip may be inserted into the aperture 34 on the mounting bracket 30 in any orientation.

The mounting bracket 30 is provided to engage the retainer clip 20 and the shock absorber to the drawer slide system. In a preferred embodiment of the present invention, the mounting bracket 30 comprises stainless steel. Generally, it is preferred to manufacture the mounting bracket from the same material as the drawer slides. The mounting bracket comprises an aperture 34 for receiving the retention clip 20, and means for retaining the retention clip and shock absorber.

In a preferred embodiment of the present invention, the means for retaining the retention clip and shock absorber comprise two vertically extending portions 32, positioned on either side of the aperture 34 along one side of the mounting bracket. With this configuration, the mounting system for a shock absorber, once assembled, will retain the shock absorber to the mounting bracket and facilitate assembly of the mounting system without the need for tools.

In a preferred embodiment of the present invention, the shock absorber, retainer clip, and mounting bracket are assembled together and retained without the use of tools. To assemble the mounting system, the retainer clip 20 is first slid into the aperture 34 in the mounting bracket. The groove 26 on the base 24 of the retainer clip 20 slides around and encompasses a portion of the mounting bracket 30 in the area adjacent to the aperture 34. In a preferred embodiment of the present invention, the mounting bracket 30 and retainer clip 20 engage on three sides to securely retain the clip 20.

In this configuration, the retainer clip 20 is prevented from movement in all but one lateral direction. The engagement of the groove along and around the portion of the mounting bracket 20 adjacent to the aperture 34 prevents movement of the retainer clip 20.

Once the retainer clip 20 and mounting bracket 30 are engaged to one another, the shock absorber is positioned within the central aperture 22 of the retainer clip 20. In a preferred embodiment of the present invention, the cylinder portion of the shock absorber 12 is slid into the central aperture 24 until the collar 16 abuts a lateral face of the retainer clip 20 or central aperture 24 thereof. The collar 16 is dimensioned to be at least slightly larger than the central aperture 24 such that it will prevent the shock absorber cylinder from extending past a certain distance into the central aperture 24.

In this configuration, the shock absorber is engaged to the retainer clip 20 in all but one lateral direction, which is different that the one lateral direction in which the retainer clip 20 can move out of engagement with the mounting bracket 30. The one free direction of movement of the mounting bracket is arrested through the interaction of the body of the shock absorber with the vertically extending portions of the mounting bracket. Thus, the combined shock absorber and retainer clip 20 are therefore securely engaged to the mounting bracket. The combination and order of assembly of the system prevents the combined shock absorber and retainer clip from moving in any direction. To disassemble the retainer clip from the mounting bracket, the shock absorber would first be removed from the retainer clip. Unless this action precedes removal of the retainer clip, the shock absorber will prevent lateral movement of the retainer clip in its free direction.

This fully assembled configuration therefore retains the shock absorber within the retainer clip and mounting bracket thereby preventing any movement of the shock absorber or retainer clip out of the assembly. Further, this is accomplished through the sliding engagement of the various components and requires no tools, adhesives, or other similar retention means.

In one embodiment of the present invention, the mounting bracket 30 is secured to a drawer slide to provide the shock absorber to a drawer slide system. The means for securing the mounting bracket include welding the metal bracket to the drawer slide, slideably securing the mounting bracket through a series of clips or apertures in the drawer slide, or other similar systems. In the preferred embodiment of the present invention, the mounting bracket is welded to an underside of a drawer slide.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. A shock absorber mounting system for a drawer slide system comprising:
   a shock absorber comprising a cylinder and a piston wherein the piston is operable to slide in and out of the cylinder and wherein air is controllably allowed to enter or escape the cylinder in response to movement of the piston;
   a retainer clip comprising a base portion having opposing sides extending therefrom to form a central aperture for receiving and retaining the shock absorbers, said base portion comprising means for engaging a mounting bracket; and,
   a mounting bracket comprising a body portion having an aperture for receiving the base of the retainer clip and a vertically extending portion extending from an edge of the mounting bracket,
   wherein said retainer clip is slideably engageable to said mounting bracket, and said shock absorber cylinder is slideably engageable to said retainer clip such that the shock absorber cylinder prevents lateral movement of the retainer clip by abutting the vertically extending portion of the mounting bracket.

2. The system of claim 1, wherein the shock absorber further comprises a collar for engaging the face of the aperture on the retainer clip.

3. The system of claim 1, wherein the means for engaging a mounting bracket comprises a groove formed in the base portion for receiving a portion of the mounting bracket therein.

4. The system of claim 1, wherein the shock absorber mounting system is fixedly attached to a drawer slide.

5. The system of claim 1, wherein the piston further comprises means for extracting the piston from the cylinder.

6. A shock absorber mounting system for a drawer slide system comprising:
   a fixed drawer slide member fixedly attached to a furniture frame; a moveable drawer slide fixedly attached to a drawer and slideably attached to the fixed slide member for guiding the drawer in and out of a furniture frame;
   a shock absorber comprising a cylinder and a piston wherein the piston is operable to slide in and out of the cylinder and wherein air is controllably allowed to enter or escape the cylinder in response to movement of the piston;
   a retainer clip comprising a base portion having opposing sides extending therefrom to form a central aperture for receiving and retaining the shock absorbers, said base portion comprising means for engaging a mounting bracket; and,
   a mounting bracket comprising a body portion having an aperture for receiving the base of the retainer clip and a vertically extending portion extending from an edge of the mounting bracket,
   wherein said retainer clip is slideably engageable to said mounting bracket, and said shock absorber cylinder is slideably engageable to said retainer clip such that the shock absorber cylinder prevents lateral movement of the retainer clip by abutting the vertically extending portion of the mounting bracket.

7. The shock absorber mounting system of claim 6, wherein the moveable drawer slide comprises a piston engaging member for engaging the piston of the shock absorber.

* * * * *

UNITED STATES PATENT AND TRADEMARK OFFICE
CERTIFICATE OF CORRECTION

PATENT NO. : 6,932,200 B2
DATED : August 23, 2005
INVENTOR(S) : Todd Booker and Georg Domenig It is certified that error appears in the above-identified patent and that said Letters Patent is hereby corrected as shown below:

Title page,
Item [56], References Cited, U.S. PATENT DOCUMENTS, "2003/0213683" should read -- 2003/0213663 --.

Column 7,
Line 47, that portion reading "receiving and retaining the shock absorbers, said base" should read -- receiving and retaining the shock absorber, said base --.

Column 8,
Line 34, that portion reading "receiving and retaining the shock absorbers, said base" should read -- receiving and retaining the shock absorber, said base --.

Signed and Sealed this

Twenty-second Day of November, 2005

JON W. DUDAS
*Director of the United States Patent and Trademark Office*